Oct. 8, 1929.  S. J. CAMPBELL  1,730,449
CUTTING MEANS
Filed March 14, 1928  2 Sheets-Sheet 1

Witness:
William P. Kilroy

Inventor:
Samuel J. Campbell
By George L. Haight
His Atty

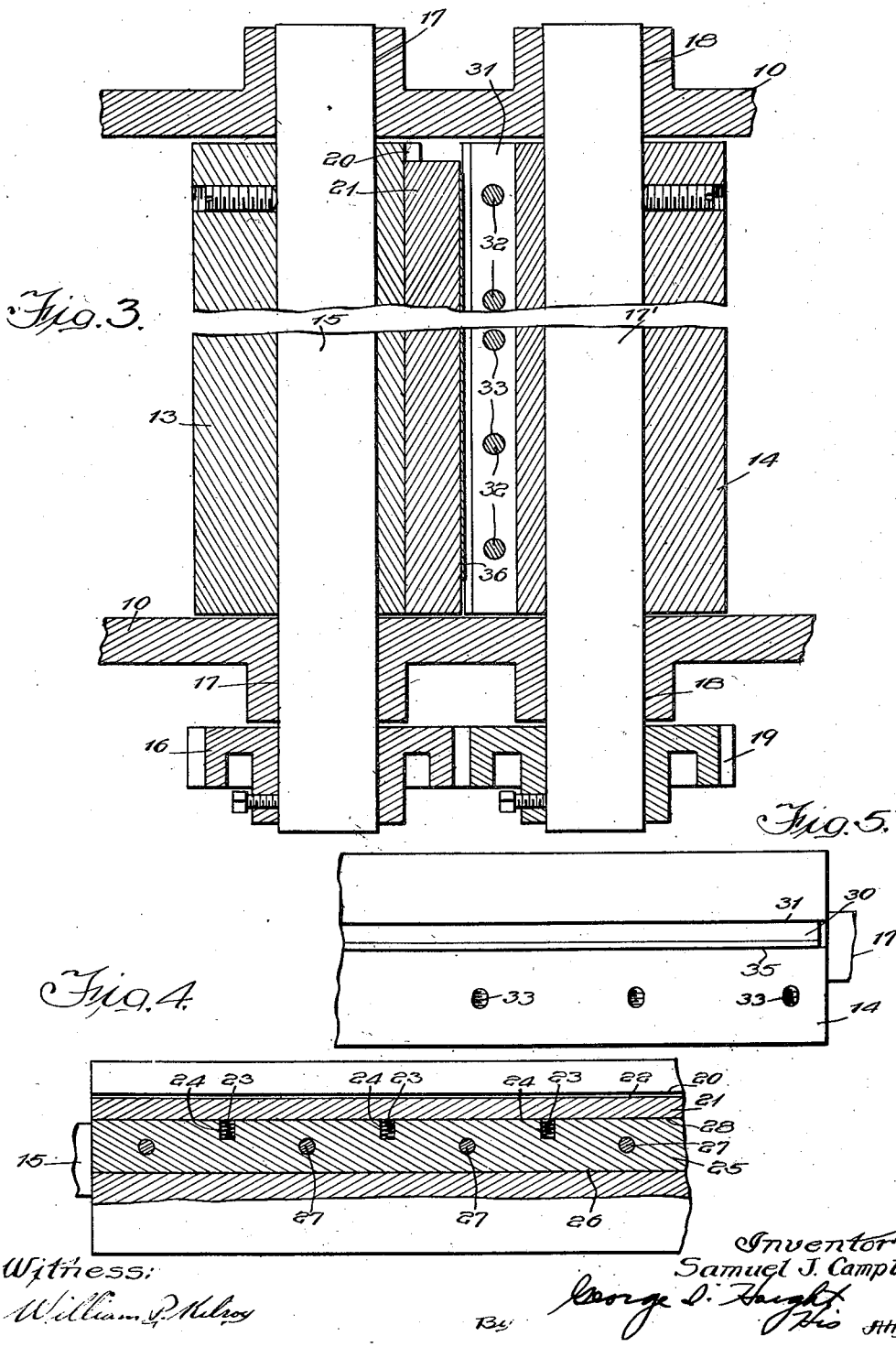

Patented Oct. 8, 1929

1,730,449

UNITED STATES PATENT OFFICE

SAMUEL J. CAMPBELL, OF GREEN BAY, WISCONSIN, ASSIGNOR TO HUDSON-SHARP MACHINE COMPANY, OF GREEN BAY, WISCONSIN, A CORPORATION OF WISCONSIN

CUTTING MEANS

Application filed March 14, 1928. Serial No. 261,686.

This invention relates to improvements in cutting means.

One object of the invention is to provide a cutting means or mechanism, especially adapted for cutting thin paper sheets or other sheet material into sections, wherein the cutting means comprises co-operating cutting dies, one of which has a cutting edge, and the other a flat surface with which the cutting edge co-operates to sever the sheet material into sections.

A further object of the invention is to provide a cutting mechanism of the character indicated, employed in connection with paper forming and cutting machines, including a pair of rotary cutter carrying elements, having co-operating cutting means thereon, one of which presents a relatively blunt cutting edge, and the other of which presents a flat surface with which the cutting edge co-operates.

A more specific object of the invention is to provide a cutting mechanism including a pair of co-operating cutting rolls, each having a cutting means mounted therein, the cutting means of one of the rolls being hinged to the roll and presenting a flat surface with which the other cutting die co-operates, the other cutting means being fixedly mounted in the co-operating cutting roll and presenting a relatively blunt cutting edge co-operating with the first cutting surface of the first named means.

Other and further objects of the invention will more clearly appear from the description and claims hereinafter following.

Figure 1:
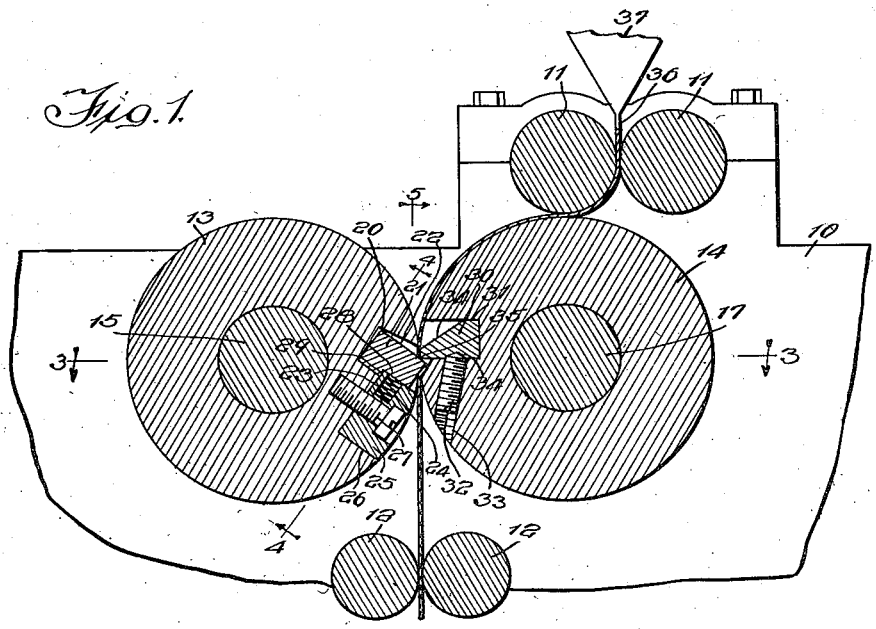
Figure 2:
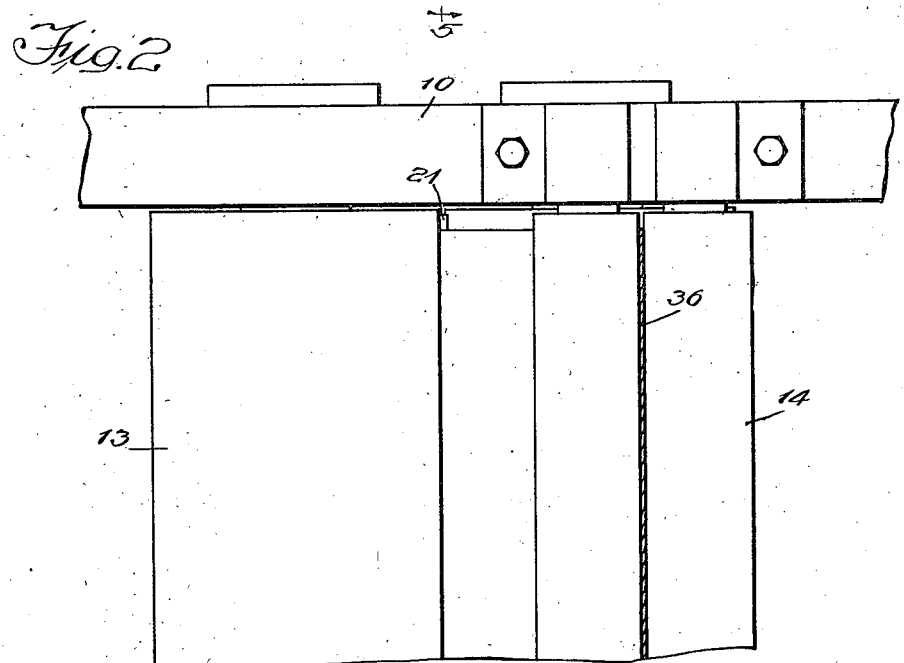

In the drawings, forming a part of this specification, Figure 1 is a vertical sectional view through my improved cutting mechanism, illustrating the rolls in cutting position. Figure 2 is a plan view of the structure illustrated in Figure 1, partly broken away. Figure 3 is a horizontal sectional view, corresponding substantially to the line 3—3 of Figure 1. Figure 4 is a sectional view through the pivoted or hinged cutting means, corresponding substantially to the line 4—4 of Figure 1. And Figure 5 is a vertical sectional view, corresponding substantially to the line 5—5 of Figure 1, and illustrating the cutting roller which carries the fixed cutting means, in elevation.

In said drawings, 10 indicates the framework of the cutting machine. The cutting machine is provided with the usual feed rollers 11—11 and 12—12, the feed rollers 11—11 feeding the strip of material to the cutting mechanism, and the feed rollers 12—12 carrying the cut-off sections away from said cutting means.

My improved cutting mechanism as shown comprises, broadly, a pair of cutting rolls 13 and 14, having co-operating cutting means mounted thereon.

The cutting roll 13 is mounted on a rotary shaft 15, which carries a gear 16 at one end thereof, the opposite end sections of the shaft 15 being mounted in journals 17—17 in the framework 10 of the machine. The gear 16 is fixed to the shaft 15 in any suitable manner and is herein shown as provided with a locking set screw.

The cutting roller 14 is mounted on a rotary shaft 17 journalled in bearings 18—18 in the frame 10 of the machine, and carries a gear 19 at one end thereof. The gear 19 is fixed to the shaft and meshes with the gear 16. Either of the shafts 15 or 17 may be the power-driven shaft of the machine, and the other shaft is driven therefrom by the interengaging gears. The driven shaft may be operated in any suitable manner and may be provided with a driving pulley or gear not shown. Both of the cutting rollers 13 and 14 are fixed to the shafts so that they rotate with the same. The cutting roller 13 is provided with a socket or recess 20 of angular cross section, extending from end to end of the roller and serving as a seat for a cutting means 21, which is of rectangular cross section. The cutting means 21 is of tempered steel and presents a flat surface 22, which co-operates with the cutting means of the cutting roller 14. As most clearly shown in Figure 1, the opposed walls of the socket 20 diverge outwardly, thereby permitting a slight rocking movement of the cutting bar 21 with respect to the roll 13. The cutting bar 21 is yieldingly supported by a plurality of coiled springs 23 seated in the pockets 24 provided in a retaining bar 25, also mounted on the cutting roll 13. The retaining bar 25 is seated in a socket 26, extending entirely across the cutting roller and having communication with the socket 20. As shown, the holding or retaining bar 25 is fixed to the cutting roller 13 by screws 27. The lower face of the pivoted cutting bar 21 is cut away, as indicated at 28, to receive the upper end portion of the retaining bar 25, and thus presents a transverse shoulder 29 which engages the inner side of the retaining bar, thereby preventing displacement of the cutting bar 21.

The cutting roll 14 carries a fixed cutting blade 30 mounted in a socket 31 of angular cross section, extending entirely across the cutting roll. The cutting blade 30 is rigidly fixed to the cutting roll 14 and snugly fits the socket 31. The same is held in position by a plurality of set screws 32 disposed within screw-threaded openings 33 in the roll 14 and engaging seats 34 at the bottom side of the cutting blade 30. The upper side of the cutting blade 30 is cut away or beveled off, as indicated at 34, thereby presenting a relatively narrow outer cutting extremity. The cutting edge of the blade 30 is designated by 35 and, as shown in the drawings, is relatively blunt. The cutting edge 35 is formed by the meeting faces of the outer and lower sides of the cutting blade, as shown in Figure 1. As shown in this figure, the surfaces of the cutting blade 30, referred to, are preferably so disposed that they meet at an angle of ninety degrees. By providing the relatively blunt cutting edge, it is clear that the life of the cutting mechanism is greatly increased over that of the usual cutting members, which have relatively sharp cutting edges.

In the disclosure illustrated in the drawings, the strip of material which is operated upon is designated by 36 and is fed by the feed rollers 11 to the cutting rollers 13 and 14. In the embodiment of the invention illustrated, the rotary cutting means are shown as associated with a paper folding machine, the paper being taken from reels not shown, and guided over a folding member 37, which is shown broken away in Figure 1.

The cutting mechanism illustrated is designed especially for use in connection with relatively light paper, such as tissue paper, which is used in making paper napkins and similar articles, although it is equally efficacious in cutting heavier sheet material. Paper of the character indicated is extremely difficult to cut because of its great thinness.

The strip of sheet material 36 is fed from the feed rolls 11 to the cutting rolls and passes between the same, as shown in the present instance, also passing over the top surface of the cutting roller 14. The articles as cut by the cutting rollers are withdrawn by the feed rollers 12. The feed rollers 11 and 12 may be operated by any suitable means and are positively driven.

In the operation of my improved cutting mechanism, the rolls 13 and 14 are rotated constantly, the cutting members 30 and 21 coming into contact intermittently. As the cutting rollers 13 and 14 are rotated, the paper or other sheet material is fed along between the cutting rollers, and in the rotation of the latter the cutting edge of the blade 30 is brought into engagement with the paper sheet. At the same time, the cutting bar 21, which is yieldingly held in its outermost position, also comes in engagement with the paper sheet at the opposite side thereof, to the cutting blade 30. The two cutting rolls are so disposed, and the operation thereof is so timed, that the cutting edge of the blade 30 will engage the top surface of the cutting bar 21. The paper sheet will thus be pressed against the surface of the bar 21 by the cutting edge of the blade 30, and in the further rotation of the cutting rollers the cutting bar 21, which is yieldingly mounted, will be forced inwardly against the tension of the springs 23, and the cutting edge of the blade 30 will slip outwardly on the co-operating surface of the cutting bar 21, thereby producing a wiping action. Due to this wiping action, the paper sheet will be severed along the line of contact of the cutting edge of the blade 30 with the flat surface of the bar 21. Upon further rotation of the cutting dies, the cut-off section of the material will be ejected by the rollers 12. During the further rotation of the cutting rollers 13 and 14, the operation just described will be repeated.

From the preceding description taken in connection with the drawings, it will be evident that I have provided an exceedingly simple, efficient and reliable cutting means for cutting sections from strips of relatively thin paper. By providing the relatively blunt cutting edge which co-operates with the cutting surface of the co-operating member, the cutters may be made of heavy construction, whereby the length of service of the same is greatly increased over that had in connection with the usual cutting dies which are in the form of thin knife blades. It is also pointed out that by providing the rubbing action between the members during the cutting operation, a relatively blunt cutting edge may be provided, which is not subject to the rapid wear that the usual keen cutting edge is subject to.

While I have herein shown and described what I consider the preferred manner of carrying out the invention, the same is merely illustrative, and I contemplate all changes and modifications which come within the scope of the claims appended hereto.

I claim:

1. In a cutting machine, the combination of a pair of co-operating cutting rollers, a cutting blade mounted on one of said rollers, and having a cutting edge presented toward its direction of rotation, a cutting bar mounted on the other roller and having a flat cutting surface, the relation between the cutting edge and the cutting surface being such as to bring the cutting edge into overlapping relation behind the flat cutting surface at the instant of contact, to cause a wiping action of the blade over the surface as the same moves out of contact, and means for rotating the rollers in timed relation to insure cutting contact of the cutting edge and the cutting surface.

2. In a cutting machine, the combination of a pair of co-operating cutting rollers, a cutting blade mounted on one of said rollers, and having a cutting edge presented toward its direction of rotation, a cutting bar mounted on the other roller and having a flat cutting surface, the relation between the cutting edge and the cutting surface being such as to bring the cutting edge into overlapping relation behind the flat cutting surface at the instant of contact, to cause a wiping action of the blade over the surface as the same moves out of contact, and means for rotating the rollers in timed relation to insure cutting contact of the cutting edge and the cutting surface, one of the cutting elements being yieldingly mounted to permit cutting contact to be maintained and to permit the blade to clear the bar.

3. In a cutting machine, the combination of a pair of co-operating cutting rollers, a cutting blade mounted on one of said rollers, and having a cutting edge presented toward its direction of rotation, a cutting bar mounted on the other roller and having a flat cutting surface, the relation between the cutting edge and the cutting surface being such as to bring the cutting edge into overlapping relation behind the flat cutting surface at the instant of contact, to cause a wiping action of the blade over the surface as the same moves out of contact, and means for rotating the rollers in timed relation to insure cutting contact of the cutting edge and the cutting surface, the blade being set within the circumference of its roller and the bar being extended beyond the circumference of its roller.

4. In a cutting machine, the combination of a pair of co-operating cutting rollers, a cutting blade mounted on one of said rollers, and having a cutting edge presented toward its direction of rotation, a cutting bar mounted on the other roller and having a flat cutting surface, the relation between the cutting edge and the cutting surface being such as to bring the cutting edge into overlapping relation behind the flat cutting surface at the instant of contact, to cause a wiping action of the blade over the surface as the same moves out of contact, and means for rotating the rollers in timed relation to insure cutting contact of the cutting edge and the cutting surface, one of the cutting elements being yieldingly mounted to permit cutting contact to be maintained and to permit the blade to clear the bar, the blade being set within the circumference of its roller and the bar being extended beyond the circumference of its roller.

5. In a cutting machine, the combination of a pair of co-operating rollers, each of the rollers being provided with a recess, a cutting blade mounted within one of said recesses and having its cutting edge projecting free of the adjacent wall of said recess and presented toward the direction of rotation of the roller, a cutting bar mounted in the recess in the other roller and having a flat cutting surface, the relation between the cutting edge and the cutting surface being such as to bring the cutting edge into overlapping relation behind the flat cutting surface at the instant of contact and to bring the cutting bar within the recess in the opposed roller at said instant to cause a wiping action of the blade over the surface of the bar as the blade moves to clear the bar, and means for rotating the rollers in timed relation to insure cutting contact of the cutting edge and the cutting surface.

6. In a cutting machine, the combination of a pair of co-operating rollers, each of the rollers being provided with a recess, a cutting blade mounted within one of said recesses and having its cutting edge projecting free of the adjacent wall of said recess and presented toward the direction of rotation of the roller, a cutting bar mounted in the recess in the other roller and having a flat cutting surface, the relation between the cutting edge and the cutting surface being such as to bring the cutting edge into overlapping relation behind the flat cutting surface at the instant of contact and to bring the cutting bar within the recess in the opposed roller at said instant to cause a wiping action of the blade over the surface of the bar as the blade moves to clear the bar, and means for rotating the rollers in timed relation to insure cutting contact of the cutting edge and the cutting surface, one of the cutting elements being yieldingly mounted to permit cutting contact to be maintained and to permit the blade to clear the bar.

In witness that I claim the foregoing I have hereunto subscribed my name this 5th day of March, 1928.

SAMUEL J. CAMPBELL.